Feb. 26, 1929.
E. L. EZBELENT
1,703,728
MACHINE FOR THE OBTAINMENT OF GATHERED WORK
Filed Jan. 14, 1926
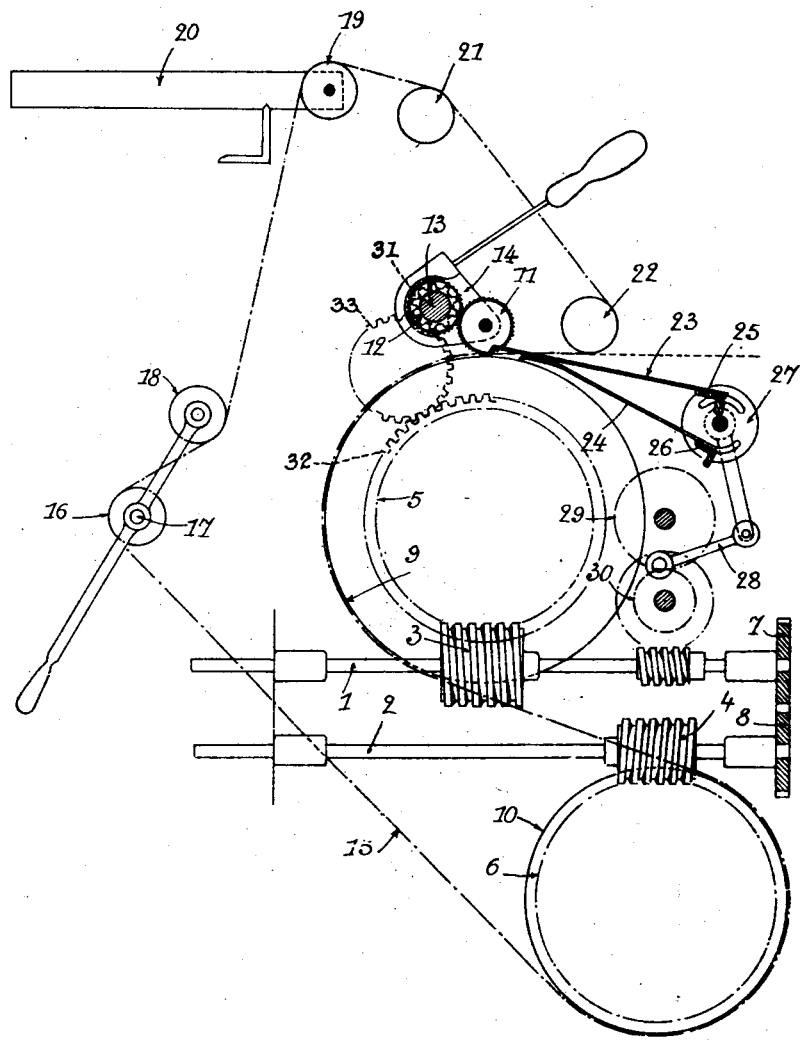
E. L. Ezbelent
INVENTOR
By: Marks & Clerk
Attys Patented Feb. 26, 1929.

1,703,728

UNITED STATES PATENT OFFICE.

EUGÉNE LOUIS EZBELENT, OF PARIS, FRANCE.

MACHINE FOR THE OBTAINMENT OF GATHERED WORK.

Application filed January 14, 1926, Serial No. 81,350, and in France April 27, 1925.

My invention relates to machines for the production of gathered or crimped work in which the cloth or any textile fabric passes between a rotatable drum and a series of flexible members driven at less speed than the peripheral speed of said drum. In such machines, at the point where the fabric is engaged between said drum and said flexible members, rollers are usually pressed yieldingly against the flexible members and drum and are frictionally rotated by said drum.

According to the present invention, said rollers are positively driven at a circumferential speed equal to that of said drum. For this purpose, said rollers are, for example, respectively in gear engagement with driving wheels which are keyed to a shaft parallel with said drum and are operatively connected with said drum.

Further characteristics and advantages of my said invention will be set forth in the following description with reference to the appended drawing showing by way of example a diagrammatic side view of a machine according to the invention.

Two shafts 1 and 2 carrying the respective worms 3, 4 engaging the worm wheels 5, 6 are actuated by the respective gear wheels 7, 8. The worm wheel 5 is secured to a cast iron drum 9 which is steam heated; the worm wheel 6 is secured to a wood cylinder 10.

I employ interchangeable gear set 7, 8 in order to vary the respective speeds of the shafts 1 and 2, and consequently the speeds of the drums 9 and 10 which they control. Suitable toothed pressure wheels or rollers 11 are in operative contact with the drum 9 and are driven by gear engagement with further rollers 12 keyed to the control shaft 13. The wheels or rollers 11 are mounted in forked holders 14 which are pivoted on the shaft 13 and are pressed upon the drum 9 by means of a counterweight or spring. The shaft 13 and the shaft of the drum 9 are operatively connected by any suitable way, for example by means of gearing wheels 31 and 32 keyed respectively on both shafts and meshing with an intermediate gearing wheel 33.

Endless cords 15 pass successively over the drum 9, the drum 10, the grooved roller 16 the shaft 17 of which is stationary, the roller 18, the position of which is adjustable by rotating the shaft 17, the rollers 19 which are controlled by the counterweight 20, and the two rollers 21 and 22, then passing in the grooves of the pressure wheels or rollers 11.

Blades 23 and 24 are carried by respective carriers 25 and 26 which are mounted on slotted disks 27; said disks may be held stationary if not used or are movable and then operated by a link 28 and interchangeable gear wheels 29 and 30; the said interchangeable wheels provide for the change in the rate of motion of the blades 23, 24.

The operation is as follows:

The drum 10 actuates by adhesion the cords 15 at the same speed as its peripheral speed which is slower than the speed of the drum 9; the pressure wheels or rollers 11 are actuated by the shaft 13 at a speed which is equal to the periphery speed of the drum 9; the cloth or any textile fabric drawn between the surface of the drum 9 and the wheels or rollers 11 and thence between the said surface and the cords 15, will be thus drawn forward at the speed of the drum 9 by the action of the wheels or rollers 11, and subsequently at the speed of the cords 15 which is lower than the preceding, so that the fabric will be necessarily gathered.

I may vary the relative speeds of the drums 9 and 10 and hence the speed of the wheels or rollers 11 and the cords 15, whereby the plaits in the work will be more or less numerous.

I obtain a gathered work, together with the formation of puffs, by the use of one blade 23 or 24, the free end of which is disposed between two consecutive cords, and herein the fabric will be raised by the said blade and will thus form certain raised or puffed up portions in higher position than the rest of the work.

Having now described my invention, what I claim as new and desire to secure by Letters Patent is:

A machine for the production of gathered work or crimped work on a textile fabric comprising a rotatable drum positively driven at a given speed, a series of flexible members bearing on a part of the periphery of said drum and positively driven at less speed than the peripheral speed of said drum, rollers adapted to press yieldingly the fabric to be gathered on said drum and means for driving positively said rollers at a circumferential speed equal to that of said drum, whereby the production of gathered or crimped work is controlled on both sides of the fabric.

In testimony whereof I have signed my name to this specification.

EUGÉNE LOUIS EZBELENT.